Patented Aug. 6, 1935

2,010,384

UNITED STATES PATENT OFFICE 2,010,384

PROCESS FOR THE SEPARATION OF ISOMERIC PENTANONES

Johannes Andreas van Melsen and Siegfried Leonard Langedijk, Amsterdam, Netherlands, assignors to Shell Development Company, San Francisco, Calif., a corporation of Delaware No Drawing. Application January 24, 1934, Serial No. 708,083. In the Netherlands March 27, 1933

8 Claims. (Cl. 260—134)

This invention relates to a process for the separation of isomeric pentanones from their naturally occurring and/or synthetic mixtures and more specifically is concerned with the concentration of at least one of the isomeric bodies from mixtures of (1) methyl propyl ketone and diethyl ketone, (2) methyl isopropyl ketone and diethyl ketone, and (3) methyl propyl ketone and methyl isopropyl ketone based on the difference in solubility of their bisulfite addition-compounds.

Where mixtures of two isomeric pentanones are encountered, it is simple enough, according to our process, to effect a substantial separation of the components. Where the three isomers occur simultaneously, then the order of relative insolubility of their bisulfite addition-compounds may be stated as follows: methyl propyl ketone, methyl isopropyl ketone and diethyl ketone. The first treatment of the latter mixtures may result in fractions containing two isomeric pentanones and the isomers separated therefrom as outlined below.

The mixture of secondary pentanols obtained via the esterification, such as sulfation, of a mixture of pentene-1 and pentene-2 and subsequent hydrolysis of the ester mixture consists mainly of pentanol-2 and its isomer pentanol-3. The mixture of the corresponding ketones prepared from the aforementioned mixture cannot be separated by fractional distillation owing to the very small difference between the boiling temperatures of methyl propyl ketone (pentanone-2) and diethyl ketone (pentanone-3). Now in the synthesis of certain substances, for instance in the preparation of ethyl ionone,

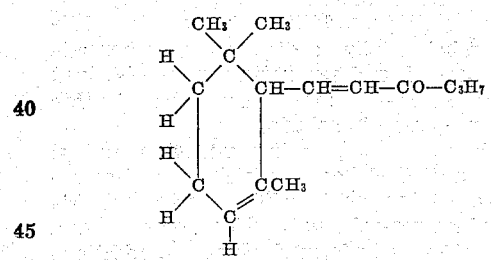

it is of great importance to have, as base material, pure methyl propyl ketone.

We have found that methyl propyl ketone can be separated from its mixtures containing diethyl ketone in a very simple manner, in a pure state and with an excellent yield by utilizing the difference in solubility between the two ketone-bisulfite compounds in bisulfite solution. It appears that methyl propyl ketone bisulfite does not readily dissolve in a saturated bisulfite solution, whereas diethyl ketone bisulfite is rather easily dissolved in such a solution.

The process, according to the invention, is preferably carried out by adding to mixtures containing the two above-mentioned ketones a certain quantity of solid bisulfite and bisulfite solution sufficient to enable the resultant saturated bisulfite solution to retain substantially all the diethyl ketone bisulfite in solution whilst the methyl propyl ketone bisulfite crystallizes out substantially completely in an easily filterable form and is separated from the rest, after which the addition-compounds obtained are worked up to the ketones.

Further, it has been found that the addition-compounds obtained can be reconverted to the ketones in a very economical manner by subjecting the ketone-bisulfite fraction to distillation with water, at subatmospheric, atmospheric and superatmospheric pressures. No losses of bisulfite worth mentioning occur, in contradistinction to the method usually followed hitherto in decomposing the bisulfite addition-compounds with the aid of acid or alkaline agents. The distillation residue, after being supplemented with a little sulfurous acid to replace that lost in the distillation, can be used again for treating a fresh lot of ketone mixture.

By applying the process to a mixture of methyl propyl ketone and diethyl ketone, containing 19% of the latter, more than 80% of the methyl propyl ketone contained in the mixture is separated in an absolutely pure state, whilst from the residual bisulfite solution, a mixture is obtained which contains 75 to 80% diethyl ketone and which can be converted to pure diethyl ketone.

Example 1

A quantity of 1600 grams amyl ketone, containing 19%, by weight, diethyl ketone and 81% methyl propyl ketone, is shaken with a solution of 2150 grams sodium bisulfite and 3200 grams water. After the reaction mixture has cooled down, the crystal slurry is drawn off and the filtrate shaken for a few hours with an excess of solid sodium bisulfite and then again filtered. In order to remove the enclosed mother lye, the crystallized products are washed with a saturated sodium bisulfite solution and then heated together after first adding two liters of water. The greater part of the ketone separates already at about 50° C. After distilling, drying over calcium chloride and rectifying, 1060 grams of pure methyl propyl ketone is obtained with a boiling temperature of 100.5° C. to 101° C., and a specific gravity 20/4=0.8062, which quantity is 82% of the methyl propyl ketone contained in the original mixture.

The ketone was likewise distilled from the filtrate of the reaction liquid obtained after shaking with solid bisulfite, the yield being 240 grams of a product with a boiling temperature of 100.5° C. to 101.5° C., and a specific gravity 20/4=0.8121. From the specific gravities of the components at 20/4, viz 0.8062 for methyl propyl ketone and 0.8140 for diethyl ketone, it follows that this product contained 76% diethyl ketone. After having been used for the same purpose several times in succession, the bisulfite washing liquids, which contain relatively little ketone, can likewise be worked up, thus attaining the maximum useful effect.

*Example 2*

33.6 grams of a mixture containing 80% of methyl isopropyl ketone and 20% of diethyl ketone are shaken with a solution of 47 grams of pure sodium bisulfite in 70 grams of water. The reaction mixture is cooled to 5° C. in order to increase the quantity of crystals which have already separated out of the solution. The crystals are then drained and washed with an ice-cooled saturated solution of sodium bisulfite and subsequently mixed with 50 grams of water, whereafter the ketone is obtained by distillation. The ketone-containing distillate is neutralized and distilled, after drying over calcium chloride. 14 grams of practically pure methyl isopropyl ketone with a boiling temperature of 93° C. to 94° C., and a specific gravity 20/4=0.8034 are thus obtained, which corresponds to a yield of 52% of the methyl isopropyl ketone present in the original mixture.

*Example 3*

172 grams of water-free methyl propyl ketone, boiling range 97.5° C. to about 109° C., having a specific gravity 20/4=0.8072, obtained from the fractionation of acetone oil, containing about 80% methyl n. propyl ketone and for the rest principally methyl isopropyl ketone, in addition to other impurities, is shaken with a solution of 230 grams of pure sodium bisulfite in 345 grams of water, after which the reaction mixture is cooled in ice and the crystal slurry drawn off. The crystals on the filter, after being washed with ice-cold saturated sodium bisulfate solution, are mixed with water and distilled. After being neutralized and dried over calcium chloride, the distillate is fractionated. Yield: 99 grams of pure methyl n. propyl ketones, which quantity is about 72% of the methyl n. propyl ketone contained in the original mixture.

The difference in solubility between methyl n. propyl ketone and methyl isopropyl ketone is not so great as in the methyl propyl ketone-diethyl ketone system. When using a mixture of methyl n. propyl ketone and methyl isopropyl ketone, it depends on the mutual concentration of the components in the mixture whether it is possible to keep the bisulfite compound of the methyl isopropyl ketone in solution and to crystallize out the methyl n. propyl ketone compound. From a mixture with relatively little methyl isopropyl ketone and much methyl n. propyl ketone, a good yield of pure methyl n. propyl ketone is obtainable. If, however, approximately equal quantities of these components are contained in the mixture, much lessened yields of pure methyl n. propyl ketone are obtainable.

Although when using less sodium bisulfite than is required for complete conversion, relatively more of the more insoluble addition-compound than the less insoluble addition-compound is formed, the yield of the pure ketone of the first compound is not as great as desired because in that case much of the relatively insoluble addition-compound remains in solution. If, on the other hand, equimolecular and preferably still larger quantities of bisulfite are used in proportion to the total ketone, owing to their great intrinsic solubility the relatively less insoluble addition-compounds formed remain in solution and furthermore reduce the solubility of the relatively more insoluble addition-compounds very considerably.

In the application of the process, sodium bisulfite may be replaced by other bisulfites soluble in water, such as the bisulfites of potassium, ammonium, calcium and the like.

The purified compounds are useful in the manufacture of perfumes as well as in the synthesis of organic compounds.

While we have in the foregoing described in some detail the preferred embodiment of our invention and some variants thereof, it will be understood that this is only for the purpose of making the invention more clear and that the invention is not to be regarded as limited to the details of operation described, nor is it dependent upon the soundness or accuracy of the theories which we have advanced as to the reasons for the advantageous results attained. On the other hand, the invention is to be regarded as limited only by the terms of the accompanying claims, in which it is our intention to claim all novelty inherent therein as broadly as is possible in view of the prior art.

We claim as our invention:

1. A process for separating isomeric pentanones which comprises reacting the mixture with a water-soluble-bisulfite solution of a strength sufficient to form the bisulfite addition-compounds and insufficient to substantially dissolve one of these addition-compounds while sufficient substantially to dissolve the other addition-compounds, and separating the undissolved matter from the dissolved matter.

2. A process for separating two isomeric pentanones which comprises reacting the mixture with a water-soluble-bisulfite solution of a strength sufficient to form the bisulfite addition-compounds and insufficient to substantially dissolve one of these addition-compounds while sufficient substantially to dissolve the other addition-compound, and separating the undissolved bisulfite addition-compound from the bisulfite addition-compound in solution.

3. A process for separating methyl n. propyl ketone from diethyl ketone which comprises reacting the mixture with solid water-soluble-bisulfite and water-soluble-bisulfite solution of a strength sufficient to form the bisulfite addition-compounds and sufficient to dissolve substantially all the diethyl ketone bisulfite without substantially dissolving the methyl n. propyl ketone bisulfite and separating the undissolved methyl n. propyl ketone bisulfite from the dissolved material.

4. A process for separating methyl n. propyl ketone from methyl isopropyl ketone which comprises reacting the mixture with solid watersoluble-bisulfite and water-soluble-bisulfite solution of a strength sufficient to form the bisulfite addition compounds and sufficient to dissolve substantially all the methyl isopropyl ketone bisulfite without substantially dissolving the methyl n. propyl ketone bisulfite and separating the undissolved methyl n. propyl ketone bisulfite from the dissolved material.

5. A process for separating methyl isopropyl ketone from diethyl ketone which comprises reacting the mixture with solid water-soluble-bisulfite and water-soluble-bisulfite solution of a strength sufficient to form the bisulfite addition-compounds and sufficient to dissolve substantially all the diethyl ketone bisulfite without substantially dissolving the methyl isopropyl ketone bisulfite and separating the undissolved methyl isopropyl ketone bisulfite from the dissolved material.

6. A process for separating two isomeric pentanones which comprises reacting the mixture with a water-soluble-bisulfite solution of a strength sufficient to form the bisulfite addition-compounds and insufficient to substantially dissolve one of these addition-compounds while sufficient substantially to dissolve the other addition-compound, separating the undissolved bisulfite addition-compound from the bisulfite addition-compound in solution and recovering pure pentanone from the undissolved bisulfite addition-compound.

7. A process for separating two isomeric pentanones which comprises reacting the mixture with a saturated water-soluble-bisulfite solution to form the bisulfite addition-compounds, which solution is of a strength insufficient to substantially dissolve one of these addition-compounds while sufficient substantially to dissolve the other addition-compound, separating the undissolved bisulfite addition-compound from the bisulfite addition-compound in solution and distilling the undissolved bisulfite addition-compound with water.

8. A process for separating two isomeric pentanones which comprises reacting the mixture with a saturated water-soluble-bisulfite solution to form the bisulfite addition-compounds, which solution is of a strength insufficient to substantially dissolve one of these addition-compounds while sufficient substantially to dissolve the other addition-compound, separating the undissolved bisulfite addition-compound from the bisulfite addition-compound in solution, distilling the undissolved bisulfite addition-compound with water, regenerating the distillation residue and using it again for the treatment of isomeric pentanones.

JOHANNES ANDREAS van MELSEN.
SIEGFRIED LEONARD LANGEDIJK.